Sept. 8, 1931.  L. EDELMANN  1,822,481
PROTECTING MEANS FOR FRANGIBLE FLOATS
Filed Feb. 9, 1929
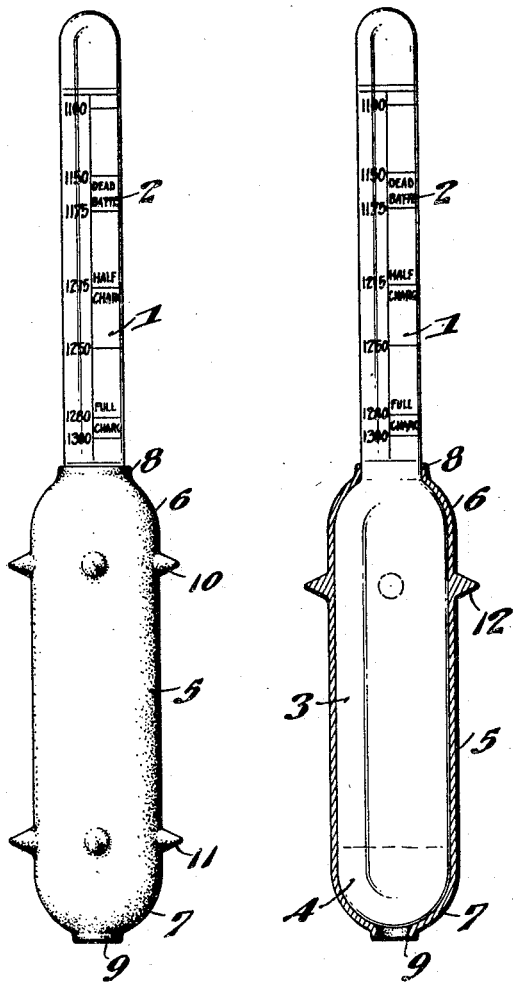
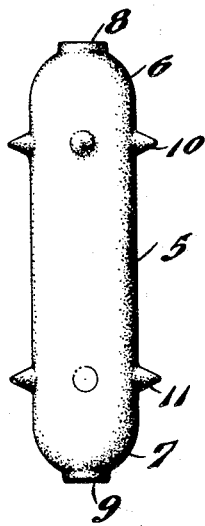
INVENTOR.
Leo Edelmann
BY
Lloyd W. Bateh
ATTORNEY.

Patented Sept. 8, 1931

1,822,481

UNITED STATES PATENT OFFICE

LEO EDELMANN, OF CHICAGO, ILLINOIS, ASSIGNOR TO E. EDELMANN & CO., OF CHICAGO, ILLINOIS, A CORPORATION OF ILLINOIS

PROTECTING MEANS FOR FRANGIBLE FLOATS

Application filed February 9, 1929. Serial No. 338,828.

My invention relates to protecting means for frangible floats and particularly to means to be used in conjunction with glass hydrometer floats and other like structures to protect the same against breakage.

An object of my invention is to provide a sleeve-like portion of cushion material which can be fitted upon the float bulb of a hydrometer float element to cover and protect the same, and which is of such construction that it will be held against accidental or casual displacement.

Another object is to so construct the protecting covering portion that the float element will be spaced and centered within the hydrometer barrel, or other liquid containing compartment during use and will be cushioned in its contact with the wall of the barrel or compartment.

Still another object is to provide a structure of this nature which can be handled as an article of manufacture to be sold separately for application to the hydrometer floats by the manufacturer, and which will fully protect and cushion the portions of the float end of a hydrometer float element.

With the above and other objects in view, it will be apparent to those skilled in the art, that my invention includes certain novel features of construction and combinations of parts which will be hereinafter set forth in connection with the drawings and then particularly pointed out in the claims.

In the drawings:

Figure 1 is a view in side elevation showing a hydrometer float element with my protecting cover applied thereto.

Fig. 2 is a view similar to Fig. 1 with the protecting cover applied thereto.

Fig. 3 is a view in side elevation of the protecting cover.

The float element illustrated in the present instance is of standard form with the stem 1 containing the indicating scale 2 and the float bulb 3 somewhat enlarged and weighted at its end 4 opposite the connection with stem 1. As the description progresses it will be apparent that my present invention can be applied to and used upon various types of hydrometer float elements, and it is to be understood that the present showing is only illustrative of application to one standard form of hydrometer float.

My improved protecting device consists of a sleeve 5, of rubber or other cushion material which is open at its end, the body portion being somewhat constricted as at 6 and 7 adjacent the ends and terminates in flanges 8 and 9 around the openings. The protecting device is made of rubber or other cushion material having certain elastic properties and the sleeve portion is preferably of slightly less transverse diameter than the outside diameter of the float bulb 3, and when my improved protecting device is fitted in place upon the float bulb the constricted portion 6 will be stretched over the float bulb and will be adjusted to rest against the shoulder of the bulb adjacent stem 1; the flange 8 fitting snugly around the base of the stem. The sleeve or body portion 5 will give to accommodate the size of the float bulb 3 so that the protecting device will have a snug fit thereon, and the flange 9 projects at the weighted end to give additional cushioning effect to prevent breakage through dropping or other shocks received at this weighted end of the hydrometer float. The opening within the flange 9 serves to permit escapement of air as the protecting device is fitted in place and to prevent the accumulation of liquid within the sleeve when the float element is in use.

Substantially conical spacing points 10 and 11 are provided around the sleeve portion 5 adjacent the constricted ends 6 and 7 to extend substantially radially from this sleeve portion. These spacing points 10 are also preferably of cushion material, and thus serve the dual purpose of reducing frictional contact of the float element with the wall of the hydrometer barrel or other liquid container, and of increasing the cushion efficiency of the protecting means.

As shown in Fig. 2, in some instances it may be deemed desirable to provide a single set of centering points 12, and these can be placed at any desired location upon the protecting means.

While I have herein shown and described only one specific embodiment of my invention upon a particular standard type of hydrometer float element, and have set forth only certain materials to be used and a certain manner of applying the protecting device, it will be appreciated that changes and variations can be made in the form, construction, material, and manner of application without departing from the spirit and scope of my invention.

I claim:

1. Protecting means for float elements comprising a sleeve of cushion material adapted to be fitted upon the float bulb of said element, and constricted adjacent its ends to contract upon the float bulb to hold against endwise displacement and to protect the end portions of said bulb.

2. A protecting means for frangible float elements comprising a sleeve of elastic cushion material open at both ends, and constricted adjacent the openings and adapted to be fitted upon the float bulb of the element with the constricted ends gripping the same to hold the sleeve against endwise displacement and to protect the end portions of said bulb.

3. A protecting means for float elements comprising a sleeve of elastic cushion material having the body thereof constricted adjacent each end and terminating in an outstanding flange at each end, said sleeve being adapted to be fitted over the float bulb of a hydrometer element with the constricted portions thereof engaging over the end portions of said bulb to hold the sleeve against endwise displacement and one flange projecting to give increased cushioning thickness at the weighted end of the hydrometer element.

4. Protecting means for float elements comprising a sleeve of cushion material adapted to be fitted upon the float bulb of said element, constricted adjacent its ends to contract upon the float bulb to hold against endwise displacement and to protect the end portions of said bulb, and spacing points on said sleeve projecting radially therefrom.

5. A protecting means for float elements comprising a sleeve of elastic cushion material having the body thereof constricted adjacent each end and terminating in an outstanding flange at each end, said sleeve being adapted to be fitted over the float bulb of a hydrometer element with the constricted portions thereof engaging over the end portions of said bulb to hold the sleeve against endwise displacement and one flange projecting to give increased cushioning thickness at the weighted end of the hydrometer element, and spacing points on said sleeve projecting radially therefrom.

In testimony whereof I hereunto affix my signature.

LEO EDELMANN.